United States Patent [19]

Morishita et al.

[11] Patent Number: 4,471,287
[45] Date of Patent: Sep. 11, 1984

[54] CHARGING GENERATOR CONTROL APPARATUS

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 477,802

[22] Filed: Mar. 22, 1983

[30] Foreign Application Priority Data

Mar. 23, 1982 [JP] Japan ................................ 57-47931

[51] Int. Cl.³ ........................... H02P 9/00; H02J 7/14
[52] U.S. Cl. ........................................ 322/99; 320/64; 322/28
[58] Field of Search ..................... 322/28, 99; 320/64, 320/68, 48

[56] References Cited

U.S. PATENT DOCUMENTS

| | | | |
|---|---|---|---|
| 3,515,978 | 6/1970 | Williams et al. | 322/99 X |
| 3,942,097 | 3/1976 | Itoh et al. | 320/64 X |
| 4,041,369 | 8/1977 | King et al. | 322/99 |
| 4,315,205 | 2/1982 | Mori et al. | 322/99 |
| 4,316,134 | 2/1982 | Balan et al. | 320/64 X |
| 4,379,990 | 4/1983 | Sievers et al. | 322/99 |

Primary Examiner—R. J. Hickey
Attorney, Agent, or Firm—Sughrue, Mion, Zinn, Macpeak, and Seas

[57] ABSTRACT

A control apparatus for a charging generator capable of detecting a non-generating state, an uncontrolled state, and a state in which there is a break in connection at the primary output terminal of the generator. A bridge rectifier coupled to the outputs of the armature winding of the charging generator provides the output voltage on first and second output terminals. A voltage regulator controls the amount of current flow in the field coil of the generator in response to the voltage produced on the first output terminal. A diagnostic circuit detects conditions of the non-generating state, the uncontrolled state, and a break in connection at the first output terminal, while a start-up detecting circuit detects the start-up condition of the generator. A charge indicator lamp and a switching circuit are connected in series between the first and second output terminals, with the switching circuit being operated by the diagnostic circuit to turn on when any of the failure conditions have been detected and to the start-up detecting circuit for preventing the lamp from being turned on during the start-up condition of the generator.

7 Claims, 3 Drawing Figures

CHARGING GENERATOR CONTROL APPARATUS

BACKGROUND OF THE INVENTION

The present invention relates to a charging generator control apparatus, and particularly to a charging generator control apparatus which is provided with a switching circuit, a diagnostic circuit and a start-up detecting circuit, with which abnormal conditions can be detected and indicated without interfering with or degrading the normal functions of a conventional control circuit.

Control apparatus for a charging generator is the subject of two U.S. patent application, Ser. Nos. 478,000 and 478,126 filed by the present inventors on Mar. 23, 1983.

Referring to FIG. 1, a conventional charging generator control circuit will be described first. In FIG. 1, a three-phase AC generator 1, which may be mounted on a vehicle (not shown) and driven by an engine (not shown) has a three-phase star-connected armature coil 101 and a field coil 102. A full-wave rectifier 2 for full-wave rectifying an AC output of the AC generator 1 is provided with a first rectifier output terminal 201, a second rectifier output terminal 202 and a ground terminal 203. A voltage regulating circuit 3 serves to control the field current flowing through the field coil 102 so as to control the output voltage of the AC generator 1 to maintain it at a first predetermined value.

The voltage regulating circuit 3 is composed of a surge absorbing diode 301 connected across the field coil 102, a pair of power transistors 302 and 303 connected in a Darlington configuration for intermittently interrupting the current flow through the field coil 102, a resistor 304 constituting a base circuit of the transistors 302 and 303, a zener diode 306 used for detecting the output voltage of the AC generator 1 at the sound rectifier output terminal 202 with the diode 306 becoming conductive when this output voltage has reached a first predetermined value, a pair of resistors 307 and 308 connected in series to constitute a voltage dividing circuit, and an initial exciting resistor 309 connected across a charge indicator lamp 6 for supplying the AC generator 1 with an initial exciting current, even when the indicator lamp is broken. Reference numerals 4 and 5 denote a battery and a key switch, respectively.

Next, the operation of the thus-arranged conventional AC generator control apparatus will be described. First, when the key switch 5 is turned on for starting the engine, a base current flows into the transistors 302 and 303 from the battery 4 through the key switch 5 and the resistor 304 making the transistors 302 and 303 conductive. When the transistors 302 and 303 become conductive, a field current flows into the field coil 102 from the battery 4 through the key switch 5, the parallel connection of the charge indicator lamp 6 and the resistor 309, the field coil 2, and the transistors 302 and 303, causing the generation of a field magnetomotive force.

Under this condition, when the engine is started and the AC generator 1 is driven, an AC output induced in the armature coil 101 is full-wave rectified by the full-wave rectifier 2. If the rectified output is lower than the first predetermined value, the dividing-point voltage of the voltage divider constituted by the resistors 307 and 308 is still too low to make the zener diode 306 conductive, and hence the supply of field current is maintained so that the output voltage of the AC generator 1 increases as the rate of rotation increases. Thereafter, as the rate of rotation of the AC generator 1 further increases, the output voltage also increases until it exceeds the first predetermined value and, correspondingly, the dividing point voltage increases to cause the zener diode 306 to conduct, whereupon a base current is supplied to the transistor 305 through the zener diode 306 making the transistor 305 conductive. When the transistor 305 becomes conductive, the transistors 302 and 303 are turned off, cutting off the current flowing through the field coil 102, whereupon the output voltage of the AC generator 1 is lowered.

When the output voltage drops again to the first predetermined value, the zener diode 306 and the transistor 305 once more become non-conductive, causing the transistors 302 and 303 to conduct and energizing the field coil 102 to cause the output of the AC generator 1 to then increase.

The above-mentioned operation is carried out continuously to maintain the output of the AC generator 1 at the first predetermined value and hence to charge the battery 4 with the thus controlled output voltage. When the battery has become fully charged, the output voltage at the second rectifier output terminal 202 becomes substantially equal to the first predetermined value, and hence the charge indicator lamp 6 is extinguished to indicate the charged state.

In the conventional apparatus as described above, in case of a partial failure such as an open circuit in the field exciting circuit, the charge indicator lamp 6 will not light even if the AC generator 1 is in a non-generating state. Thus, the conventional apparatus has a disadvantage that the non-generating state cannot be detected and hence no indication produced of a discharged battery. Moreover, a break in a connection at the first rectifier output terminal 201 cannot be detected.

Accordingly, it is an object of the present invention to provide an AC charging generator control apparatus in which abnormal states or conditions, such as the non-generating stage, the uncontrolled state and the state in which there is a break in connection at the first rectifier output terminal can be detected and indicated.

SUMMARY OF THE INVENTION

This, as well as other objects of the invention, are met by a control apparatus for a charging generator including a bridge rectifing circuit, a voltage regulator, a diagnostic circuit means, start-up detecting means, and a series combination of a charge indicator lamp and switching circuit means. The bridge rectifying circuit is coupled to outputs of the armature winding of the charging generator for rectifying the AC voltage induced in the armature winding. The rectifying circuit has first and second rectified voltage output terminals, with the first output terminal being coupled to a battery to be charged and the second output terminal being coupled to a field coil of the generator. The voltage regulator is employed for controlling the amount of current flow in the field coil of the generator in response to the voltage present on the first output terminal of the bridge rectifying circuit. The diagnostic circuit means is capable of detecting conditions of (a) a non-generating state of the generator, (b) an uncontrollable state of the generator, and (c) a break in connection between the bridge rectifying circuit and the first output terminal. The start-up detecting means is employed for detecting the start-up condition of the generator. The switching circuit is coupled to outputs of both the diagnostic circuit means and the start-up detecting means, whereby the indicator lamp is turned on when the diagnostic circuit means detects any of the conditions (a) to (c) and is turned off when the start-up detecting means detects the start-up condition. The non-generating state, the uncontrolled state and the start-up condition can all be detected by comparing appropriate reference voltages with the output of the generator. A break in connection between the bridge rectifying circuit and the first output terminal can be detected by sensing the presence of peaks of a predetermined magnitude in the output voltage of the generator.

DESCRIPTION OF THE PREFERRED EMBODIMENTS

Figure 2:
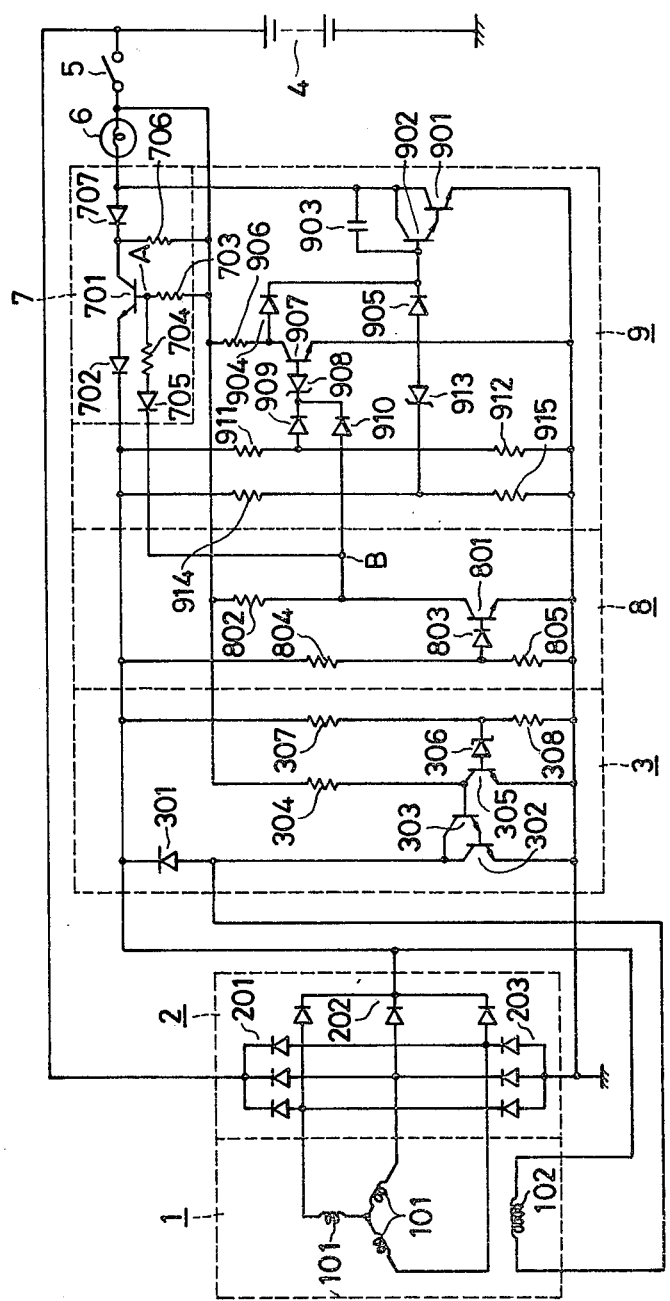
FIG. 2 is a circuit diagram of a control apparatus constructed in accordance with the present invention.

Referring to FIG. 2, a preferred embodiment of a charging control apparatus of the present invention will now be described.

Figure 1:
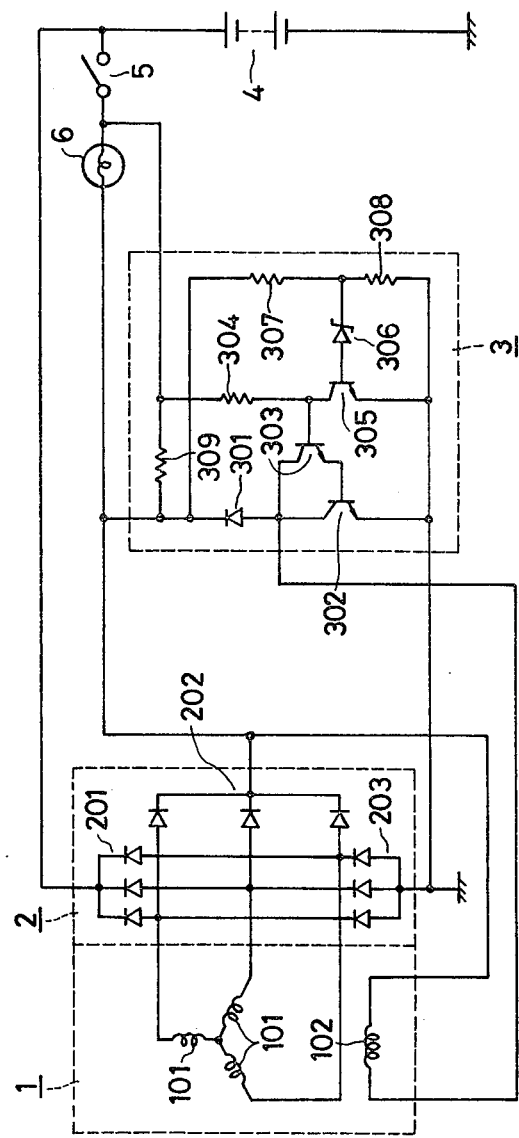
FIG. 1 is a circuit diagram of a conventional control apparatus.

In FIG. 2, a switching circuit 7 is composed of a series control transistor 701 which causes an initial exciting current to flow during the start-up state of the AC generator 1 and which sets the voltage at the second rectifier output terminal 202 to a designated value in case of an open-circuit failure in the exciting circuit, a diode 702 for blocking a reverse current during the generating operation of the AC generator 1, a pair of resistors 703 and 704 connected in series with each other to form a voltage-dividing circiuit for setting the voltage at the point A in case of open-circuit failure of the exciting circuit, a diode 705 for indicating to the switching circuit 7 the start-up state of the AC generator 1, an initial exciting resistor 706 corresponding to the initial exciting resistor 309 in the conventional apparatus shown in FIG. 1, and a diode 707 for blocking the current from the initial exciting resistor 706 when a charge indicator lamp 6 is lit by a diagnostic circuit 9 (to be described below).

A start-up detecting circuit 8 is composed of a transistor 801 which is turned on when the output voltage at the second rectifier output terminal 202 exceeds a fourth predetermined value defining the start-up state of the AC generator 1, a resistor 802 which allows a current to flow into the diagnostic circuit 9 to release the non-generating state detection state, a level-shifting diode 803 connected to the base circuit of the transistor 801, and a pair of resistors 804 and 805 connected in series with each other to form a dividing circuit for dividing the output voltage at the second rectifier output terminal 202.

The diagnostic circuit 9 is provided for detecting abnormal states and, in such an event, lighting the charge indicator lamp 6. The diagnostic circuit 9 is composed of a pair of Darlington-connected switching elements or transistor 901 and 902 connected between the charge indicator lamp 6 and ground, a capacitor 903 for absorbing ripple components, a pair of diodes 904 and 905 connected in an OR gate arrangement, a resistor 906 connected through the diode 904 to the base circuit of the transistors 901 and 902, a transistor 907 which is turned off when the output voltage at the second rectifier output terminal 202 is at a value which is larger than a fourth predetermined value but smaller than a second predetermined value so as to cause a base current to flow through the diode 904 into the transistors 901 and 902 to make these transistors 901 and 902 conductive, a zener diode 908 which is connected in series with the base terminal of the transistor 907 and is used to cause the transistor 907 to conduct when the output voltage at the second rectifier output terminal 202 is at a value which is smaller than the fourth predetermined value or larger than the second predetermined value, a pair of diodes 909 and 910 connected in an OR gate arrangement, a pair of resistors 911 and 912 connected in series with each other to form a voltage-dividing circuit for dividing the voltage at the second rectifier output terminal 202, a zener diode 913 which is made conductive when the voltage at the second rectifier output terminal 202 is at a value larger than a third predetermined value (defining the uncontrolled state), and a pair of resistors 914 and 915 connected in series with each other to form a voltage-dividing circuit for dividing the voltage at the second rectifier output terminal 202 so that when the voltage at the second rectifier output terminal 202 takes a value larger than the third predetermined value defining the uncontrolled state, a base current is made to flow into the transistors 901 and 902 through the zener diode 913 and the diode 905 to thereby render the transistors 90 and 902 conductive.

The operation of the thus-arranged AC generator control apparatus of the described preferred embodiment of the invention will now be described.

In the switching circuit 7, the voltage at the point A in case of an open-circuit failure of the exciting circuit is set to be a value larger than the fourth predetermined value defining the start-up state but smaller than the second predetermined value defining the non-generating state. When the above-mentioned condition is met, the transistor 801 in the start-up detecting circuit 8 is turned on. Thus, the voltage at the point A is then determined by the resistance ratio of the resistor 703 to the resistor 704 (if the voltage drops of the transistor 801 and the diode 705 are disregarded). It is necessary, in this case, to select the resistance of the resistor 703 to be a value obtained by dividing the initial exciting current by the current amplification factor of the transistor 701.

Further, the zener voltage of the zener diode 908 is selected such that the voltage at the point B when the transistor 801 is in its off state exceeds the voltage at the point A. If the zener diode voltage is so selected, the diode 705 will be reversely biased so that the entire amount of the current passing through the resistor 703 flows as the base current of the transistor 701. Accordingly, the resistor 703 should be selected to have a large resistance value.

Next, when the key switch 5 is turned on to start the engine, an initial exciting current flows from the battery 4 into the field coil 102 through the key switch 5, the parallel connection of the initial exciting resistor 706 and the series connection of the charge indicator lamp 6 and the diode 707, the transistor 701, the diode 702, the field coil 102, and the transistors 302 and 303, thus generating a field magnetomotive force and lighting the charge indicator lamp 6. When the engine has been started, the AC generator 1 has begun the generate power, and the output of the AC generator 1 has reached the first predetermined value as set by the voltage regulating circuit 3, there is substantially no difference between the voltage of the battery 4 and the voltage at the second rectifier output terminal 202, and therefore the charge indicator lamp 6 will be extinguished. At this time, the diode 702 blocks current flow from the second rectifier output terminal 202 to the battery 4. In this manner, the transistor 701 is protected against damage.

Under this condition, in case of an open-circuit failure in the exciting circuit constituted by the field coil 103, the transistors 302 and 303, or their interconnections, the zener diode 908 is rendered non-conductive, turning off the transistor 907, since the voltage at the point A is then set to a value larger than the fourth predetermined value but smaller than the second predetermined value. Upon the turning off of the transistor 907, the transistors 901 and 902 are supplied with a base current through the resistor 906 and the diode 904 and are therefore turned on so as to light the charge indicator lamp 6.

The transistor 801 is in its off state while the voltage at the second rectifier output terminal 202 assumes a value smaller than the fourth predetermined value in the non-generating state during the start up of the AC generator 1. Thus, the transistor 907 is supplied with its base current through the resistor 802, diode 910 and the zener diode 908 and is therefore turned on to prevent erroneous detection of the non-generating state. Thus, it is possible with the invention to maintain a desirable start-up characteristic due to the reduction in the initial exciting current which is caused by the current flowing through the charge indicator lamp 6 if the transistors 901 and 902 were turned on.

Next, in case it becomes impossible to maintain the output voltage at the first predetermined value and the output exceeds the third predetermined value defining the uncontrolled state due, for instance, to a failure in the voltage regulating circuit 3, the dividing point voltage of the dividing circuit constituted by the resistors 914 and 915 increases to the point that the zener diode 913 conducts. When the zener diode 913 conducts, the transistors 901 and 902 are supplied with base current and are therefore turned on, lighting the charge indicator lamp 6.

Figure 3:
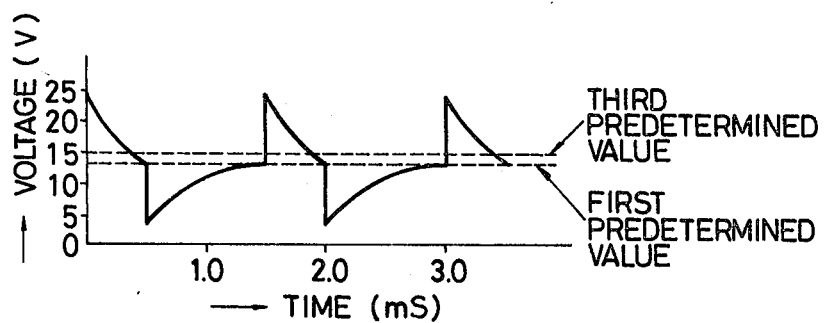
FIG. 3 is a waveform diagram showing the form of a voltage between first and second rectifier output terminals in the case of a break in connection in the rectifying circuit.

In the case where the battery 4 cannot be charged in spite of the fully generating state of the AC generator 1 due to a failure such as a break in connection at the second rectifier output terminal 202, a waveform as shown in FIG. 3 will appear at the first and second rectifier output terminals 201 and 202. At this time, as shown in FIG. 3, there is a period in which the output voltage exceeds the third predetermined value. The zener diode 913 is conductive in this period, and therefore the transistors 901 and 902 are intermittently supplied with base current through the diode 905. However, the transistors 901 and 902 are always held in the on state due to the function of the capacitor 903, thereby causing the charge indicator lamp 6 to light continuously.

In FIG. 2, the start-up detecting circuit 8 and the diagnostic circuit 9 may be implemented with comparator circuits with the same effect.

As described above, in the preferred embodiment of the charging control apparatus of the present invention, abnormal states such as the non-generating state, the uncontrolled state and the state in which there is a break in connection at the first rectifier output terminal 201, which could not be detected in the conventional system, are detected to thereby properly light the charge indicator lamp 6. That is, the presence of the non-generating state due, for example, to an open-circuit failure in the exciting circuit, is detected by setting the voltage at the point A to a value larger than the fourth predetermined value but smaller than the second predetermined value. Similarly the uncontrolled state is detected by appropriately setting the third predetermined value. Further, a break in connection at the first rectifier output terminal 201 is detected by utilizing the fact that the output voltage exceeds the third predetermined value for a certain period when this type of failure occurs. Thus, the invention is advantageous in that discharge of the battery 4 is prevented in the non-generating state and in the case of a break in connection at the first rectifier output terminal 201, while overcharging damage and/or failure of the electrical load is prevented in the uncontrolled state. Further, any reduction in the initial exciting current due to current flow through the charge indicator lamp is suppressed, thereby optimizing the start-up characteristic of the AC generator.

As shown in FIG. 2, since the above-mentioned functions can be realized with a simple circuit configuration, the apparatus can be made small in size and inexpensive.

We claim:

1. A control apparatus for a charging generator comprising:
    a bridge rectifying circuit coupled to outputs of an armature winding of a charging generator for rectifying an alternating voltage generated in said armature winding, said rectifying circuit having first, second and third rectified voltage output terminals, said first output terminal being coupled to a battery to be charged, said second output terminal being coupled to a field coil of said generator, and said third output terminal being coupled to a local ground;
    voltage regulating means for controlling an amount of current flow in said field coil in response to a voltage across said first and third output terminals;
    diagnostic circuit means for detecting conditions of a non-generating state of said generator (b) an uncontrolled state of said generator, and (c) a break in connection between said bridge rectifying circuit and said first output terminal, said diagnostic circuit being coupled to said local ground;
    start-up detecting means for detecting a start-up condition of said generator; and
    a charge indicator lamp and switching circuit means coupled in series between said first and second output terminals, said switching circuit means being coupled to outputs of said diagnostic circuit means and said start-up detecting means for turning on said lamp when said diagnostic circuit means detects any of said conditions (a) to (c) and for preventing said lamp from turning on when said start-up detecting means detects said start-up condition.

2. The control apparatus for a charging generator of claim 1, wherein said voltage regulating means comprises means for maintaining an output voltage at said second output terminal at a first predetermined value.

3. The control apparatus for a charging generator of claim 2, wherein said diagnostic circuit means comprises means for supplying second and third predetermined values, said second predetermined value being smaller than said first predetermined value, said third predetermined value corresponding to an output voltage of said generator above which said generator is assumed to be operating in said non-controlled state, and said second predetermined value corresponding to a peak level of said output voltage on said second output terminal below which it is assumed a break in connection has occurred between said bridge rectifying circuit and said first output terminal, said third predetermined value being larger than said first predetermined value.

4. The control apparatus for a charging generator of claim 1, further comprising a key switch coupled in series with said indicator lamp and said switching means between said first and second output terminals.

5. The control apparatus for a charging generator of claim 4, wherein said switching circuit comprises a bipolar transistor; first and second diodes coupled in series with a collector and an emitter of said transistor and in a series connection with said indicator lamp; a voltage divider circuit having a voltage-division junction point coupled to a base of said transistor, one end coupled to said first output terminal and the other end coupled to said output of said start-up detecting means; and a resistor for supplying an initial start-up current to said field coil.

6. The control apparatus for a charging generator of claim 5, wherein said output from said diagnostic circuit means is coupled to a junction point between said indicator lamp and said switching circuit.

7. A control apparatus for a charging generator comprising:
a bridge rectifying circuit coupled to outputs of an armature winding of a charging generator for rectifying an alternating voltage generated in said armature winding, said rectifying circuit having first, second and third rectified voltage output terminals, said first output terminal being coupled to a battery to be charged, said second output terminal being coupled to a field coil of said generator, and said third output terminal being coupled to a local ground;
voltage regulating means for controlling an amount of current flow in said field coil in response to a voltage across said first and third output terminals, wherein said voltage regulating means comprises means for maintaining an output voltage at said second output terminal at a first predetermined value;
diagnostic circuit means for detecting conditions of (a) a non-generating state of said generator, (b) an uncontrolled state of said generator, and (c) a break in connection between said bridge rectifying circuit and said first output terminal, said diagnostic circuit being coupled to said local ground, wherein said diagnostic circuit means comprises means for supplying second and third predetermined values, said second predetermined value being smaller than said first predetermined value, said third predetermined value corresponding to an output voltage of said generator above which said generator is assumed to be operating in said non-controlled state, and said second predetermined value corresponding to a peak level of said output voltage on said second output terminal below which it is assumed a break in connection has occurred between said bridge rectifying circuit and said first output terminal, said third predetermined value being larger than said first predetermined value;
start-up detecting means for detecting a start-up condition of said generator, wherein said start-up detecting means comprises means for supplying a fourth predetermined value which is smaller than said second predetermined value, and means for comparing said output voltage from said generator on said second output terminal with said fourth predetermined value; and
a charge indicator lamp and switching circuit means coupled in series between said first and second output terminals, said switching circuit means being coupled to outputs of said diagnostic circuit means and said start-up detecting means for turning on said lamp when said diagnostic circuit means detects any of said conditions (a) to (c) and for preventing said lamp from turning on when said start-up detecting means detects said start-up condition.

* * * * *